(12) United States Patent  (10) Patent No.: US 8,594,429 B2
Delorme et al.  (45) Date of Patent: Nov. 26, 2013

(54) METHOD AND APPARATUS FOR PROCESSING A VIDEO STREAM

(75) Inventors: Alexandre Delorme, Grenoble (FR); John M. Main, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2685 days.

(21) Appl. No.: 11/247,875

(22) Filed: Oct. 11, 2005

(65) Prior Publication Data

US 2007/0083815 A1  Apr. 12, 2007

(51) Int. Cl.
*G06K 9/00* (2006.01)

(52) U.S. Cl.
USPC ........... 382/181; 382/190; 382/206; 382/209; 382/219; 382/224; 715/723; 386/46; 386/84; 386/94

(58) Field of Classification Search
USPC ......... 382/181, 209, 103, 190, 206, 218, 219, 382/224; 715/723; 386/46, 84, 94; 348/700, 348/701, 702
See application file for complete search history.

(56) References Cited

U.S. PATENT DOCUMENTS

| | | | |
|---|---|---|---|
| 5,436,653 A | 7/1995 | Ellis et al. | |
| 5,440,400 A * | 8/1995 | Micheron et al. | 386/39 |
| 5,852,823 A | 12/1998 | De Bonet | |
| 6,233,253 B1 | 5/2001 | Settle et al. | |
| 6,289,163 B1 * | 9/2001 | Wang | 386/46 |
| 6,425,825 B1 | 7/2002 | Sitrick | |
| 6,456,783 B1 | 9/2002 | Ando et al. | |
| 6,563,532 B1 | 5/2003 | Strub et al. | |
| 6,633,723 B1 | 10/2003 | Kuroda et al. | |
| 6,707,774 B1 | 3/2004 | Kuroda et al. | |
| 6,763,148 B1 | 7/2004 | Sternberg et al. | |
| 6,792,043 B1 | 9/2004 | Takahashi et al. | |
| 6,826,315 B1 * | 11/2004 | Wickes | 382/305 |
| 7,373,604 B1 * | 5/2008 | Asch | 715/723 |
| 2002/0163532 A1 * | 11/2002 | Thomas et al. | 345/723 |
| 2006/0228029 A1 * | 10/2006 | Zhang et al. | 382/232 |

FOREIGN PATENT DOCUMENTS

| | | |
|---|---|---|
| EP | 0 367 585 | 11/1989 |
| JP | 2005-101869 | 9/2003 |
| WO | 2004061711 A1 | 4/2004 |

* cited by examiner

*Primary Examiner* — Wesley Tucker

(57) ABSTRACT

Methods for processing a video stream are provided. One embodiment comprises generating a comparison signature for a frame of a video stream and comparing the comparison signature to a reference signature. In another embodiment, a method comprises generating a reference signature for a frame of a video stream and assigning an action to the frame containing the reference signature. Example system embodiments for implementing the aforementioned methods are also provided.

27 Claims, 4 Drawing Sheets

METHOD AND APPARATUS FOR PROCESSING A VIDEO STREAM

BACKGROUND

With the advent of video recording technologies and of suitable media for storing such recorded video content, it has become common for individuals to possess an assortment of such recorded video content. For example, video tapes, such as analog or digital tapes, and digital video disks (DVDs) are readily available for purchase, enabling consumers to collect television shows, movies, sporting events, and other entertainment stored on these types of media. Consumers may, therefore, steadily amass a collection of televisions shows, movies, events, and so forth, through the continued purchase of such video tapes or DVDs. An individual's collection of video footage may also include television shows and events recorded by the individual onto video tape, DVD, or a digital video recorder (DVR). In addition, an individual's collection of video footage may include personal footage created by the individual using a camcorder, when such footage is stored on an analog or digital video tape, a DVD, or a magnetic memory card. In these various ways an individual may, over time, amass an extensive collection of purchased or created video content on a variety of different types of storage media.

As new types of storage media and formats arise, however, an individual may find themselves having to maintain a variety of different players in order to maintain access to the different media upon which their various videos are stored. In such circumstances, the individual may transfer contiguous or non-contiguous video content onto a common media type, such as by transferring video footage saved on video tapes onto DVDs. For example, an individual may copy the contiguous contents of a video tape to a DVD, essentially making a DVD version of the video tape. Alternatively, the individual may copy non-contiguous video content, such as excerpts from a video tape or from multiple video tapes, such that the resulting DVD contains only the desired video content from one or more video tapes.

This approach has the advantage of allowing the individual to discard older video player technologies, such as video cassette recorders (VCRs), and to take advantage of the benefits associated with the newer media technologies. Transferring a video from one media type to another, however, may be a laborious process, particularly if only select portions of the video content are to be transferred. For example, to transfer the video content on a video tape to a DVD, the video output of a VCR player may be connected to the video input of a DVD recorder such that the entire content of video tape may be recorded onto a DVD by simultaneously playing the video tape in the VCR and recording on the DVD recorder. However, if only select portions of the video tape are to be transferred, an operator must be present to record only the desired portions of the video onto DVD and to prevent recording of the undesired portions of the video. Alternatively, the functions of video tape playback and DVD recording may be combined into a single device; however, even in such a combined device, unsupervised recording of only portions of the video tape is not possible absent some amount of operator intervention.

DETAILED DESCRIPTION

As discussed below, embodiments of the present invention comprise a technique for identifying selected portions or frames of a video stream. These identified frames are used to prompt designated actions, such as recording or differentially processing the identified frames and/or a set of subsequent frames. For example, in accordance with aspects of the present invention, an operator associates different instructions, such as the beginning or ending of a recording operation, with different frames, to produce an action plan. The operator may produce this action plan by selecting frames (such as start or stop frames) or a common frame characteristic (such as a face or brightness level) that are associated with a recording or processing operation. The action plan can be used to automatically process a video stream based on the instructions and identified frames within the action plan. For example, in one embodiment, a frame associated with a start instruction automatically begins a recording operation while a different frame associated with a stop instruction automatically ends the recording operation. Similarly, in another embodiment, all frames having an identified content characteristic, such as a person's face, a geographic landmark, a structure or object, a date/time stamp, and so forth, are recorded while frames without the identified content are not recorded. In this manner, an action plan is used to enable unattended or automated recording or processing of a video stream, such as by a computer or other consumer electronic device, to generate an abbreviated or processed version of the video stream. The abbreviated or processed video stream can then be stored on a suitable medium, which may or may not differ from the medium on which the original video stream is stored.

Figure 1:
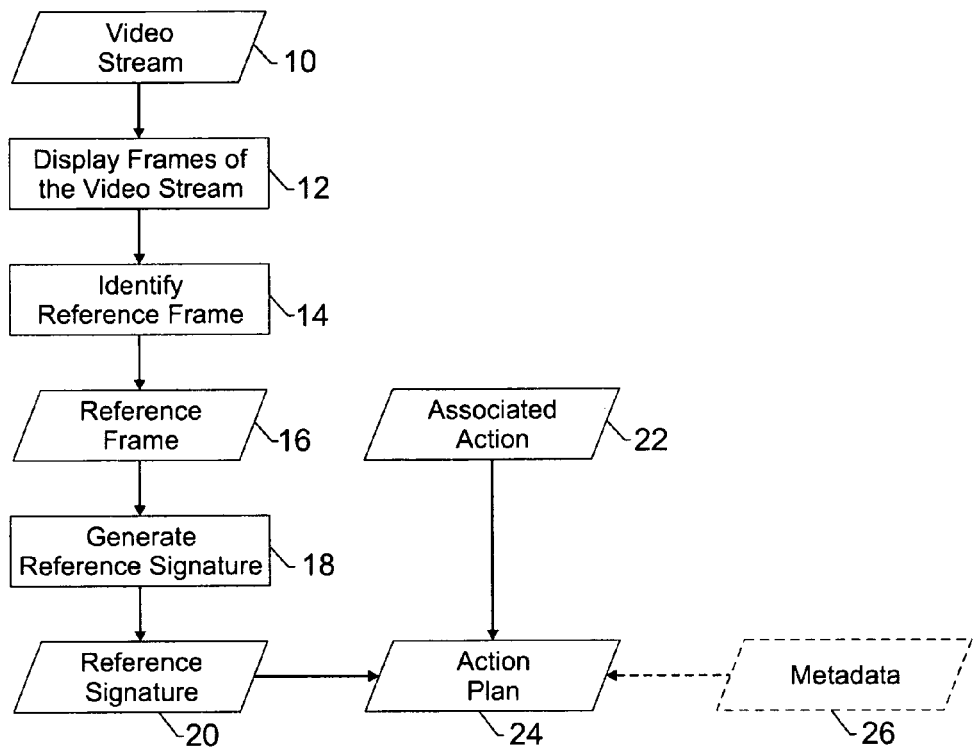
FIG. 1 is a flowchart depicting exemplary generation of an action plan comprising reference signatures and associated actions, in accordance with aspects of the present invention.
Figure 2:
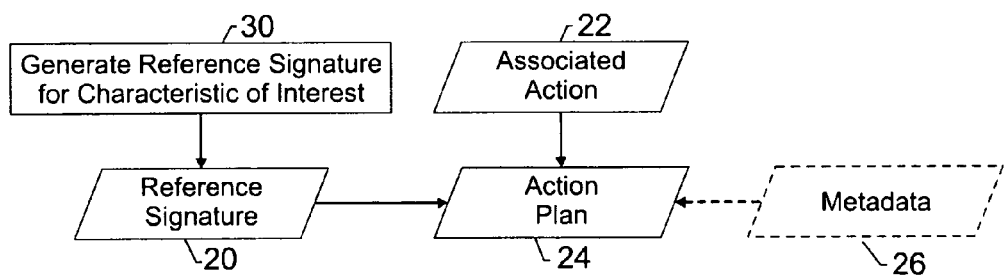
FIG. 2 is a flowchart depicting an alternative exemplary generation of an action plan comprising reference signatures and associated actions, in accordance with aspects of the present invention.

Turning to the figures, FIGS. 1 and 2 depict different examples of the generation of an action plan that can be used in the processing of video stream. For example, FIG. 1 depicts a flowchart of an embodiment of the present invention in which an operator identifies one or more frames of interest and associates a desired action with each identified frame. An initial video stream 10 is played or displayed for a viewer, such as by displaying the frames of the video stream 10 (block 12). In one embodiment, the video stream 10 is obtained by reading an analog or digital video tape. In other embodiments, the video stream 10 is obtained by reading a DVD or a hard drive, such as in a personal computer or DVR. In further embodiments, the video stream 10 is obtained over a network connection, such as over the Internet, or over a television delivery medium, such as via a cable television connection or antenna.

The viewer identifies a reference frame 16 in the video stream 10 (block 14). In one implementation, the act of identifying the reference frame 16 is accomplished by pressing a button or switch of an input device or other selectable interface when the reference frame 16 is displayed. For example, in this embodiment, a reference frame 16 is identified when an operator pushes or otherwise activates a button on a remote control or keyboard when the frame is displayed. Alternatively, in a software embodiment of the depicted process, a reference frame 16 is identified by the operator via a graphical user interface for the software, such as by selecting a menu option or a virtual button displayed on a monitor.

A unique reference signature 20 is generated for the identified reference frame 16 (block 18). In one embodiment, the reference signature 20 is generated by the execution of a signature-generating algorithm. For example, in one implementation, the signature-generating algorithm generates a checksum based on the pixel values associated with the reference frame 16, and the checksum serves as the reference signature 20. In other embodiments, the signature-generating algorithm generates the reference signature 20 based on other information contained within the reference frame 16, such as luminance, color, contrast, and so forth. The signature-generating algorithm may be a checksum function, as noted above, a hash or other encryption function, or any other function configured to or capable of generating a unique signature based upon one or more inputs derived from a video frame.

As will be appreciated by those of ordinary skill in the art, a unique reference signature might not be generated if a reference frame 16 is selected that is indistinguishable from other frames of the video stream 10. For example, if multiple identical frames (such as frames or other images of uniform color or contrast, frames of a test pattern, frames of a static or unchanged scene, and so forth) are present in the video stream 10 and one such frame is identified as a reference frame 16 at block 14, the resulting signature may not be unique, i.e., other identical frames would generate the same reference signature. To address this possibility, in one implementation the identification of the reference frame 16 at block 14 is limited to those frames having unique video content, i.e., limited to dynamic or non-repeated image content, as opposed to frames of uniform colors or patterns or other duplicative video content. In this embodiment, a preceding or subsequent frame having unique video content is identified as the reference frame 16. For example, if an operator selects the reference frame 16 to indicate the initiation of a recording operation, the next unique frame is automatically identified by embodiments of the present invention as the reference frame 16. Conversely, if an operator selects the reference frame 16 to indicate the termination of a recording operation, the most recent preceding unique frame is automatically identified as the reference frame 16 by embodiments of the present invention. In this manner, non-unique frames are automatically precluded from use as a reference frame 16, thus preventing the generation of non-unique reference signatures 20.

In other implementations, a sequential or time index is associated with each frame of the video stream 10, such as during the display of the frames at block 12. This index is used as part of the reference signature 20 or as part of the input to the signature generating algorithm such that a unique reference signature 20 is generated even though the selected reference frame 26 is not unique. In this manner, frames that are identical, repeated, or otherwise not distinguishable from one another can still be differentiated by their respective reference signature 20.

In the depicted embodiment, the reference signature 20 is combined with an associated action 22 to form an action plan 24 that is used to process the video stream 10. In one implementation, the associated action 22 is an instruction to begin or to cease recording of the video stream 10. In other implementations, the associated action is an instruction to apply a filter, to adjust the sharpness, contrast, brightness, color, noise or resolution, and/or to otherwise alter other video characteristics of the reference frame 16 and/or subsequent frames.

In one implementation, the associated action 22 is generated by the act of identifying a reference frame 16 at block 14. For example, a reference frame 16 is identified at block 14 when a "start" button is pressed by a user, thereby identifying the reference frame 16 and generating an associated action 22, in this example the action of starting a recording process. Furthermore, in this example, a reference frame 16 is identified at block 14 when a "stop" button is pressed by a user, thereby identifying the reference frame 16 and generating an associated action 22, in this example the action of stopping a recording process. These functions are repeated for each portion of the video stream 10 to be recorded so that, in this example, a reference frame 16 is selected at the beginning and end of each portion and associated with the appropriate start or stop command. The "start" and "stop" buttons pressed by the user may be on a remote control of a consumer electronic device designed for the playback and editing of video stream 10. In other embodiments, the "start" and "stop" buttons or commands may be part of a graphical user interface of a software implementation of the present technique or keystrokes recognized by such a software implementation. In such implementation, the identified reference frames 16 and associated actions 22 are stored on a memory component, such as a memory chip or hard drive, either prior to compilation into the action plan 24 and/or as constituents of the action plan 24. Once generated, the action plan 24 is used to record portions of the video stream 10 in an unattended, automatic manner.

In one embodiment, the action plan includes metadata 26. The metadata 26 may be textual, numeric and/or audio annotations to be associated with a video file generated using the action plan 24. For example, the metadata 26 may be a textual description of the contents of the video file generated upon implementation of the action plan 24 or may be a textual and/or numeric description (such as chapter headings, date/time stamps, synopses, and so forth) of the different video excerpts coded for recording and/or processing by the action plan 24. Similarly, the metadata may be an audio clip or file, such as a verbal annotation or description or a piece of music.

Referring now to FIG. 2, a flowchart is provided depicting another embodiment of the present invention in which the reference signature 20 is not generated based upon a frame extracted from a video stream. Instead, the reference signature 20 is generated, at box 30, based on a video signal characteristic or a video content characteristic within a video stream. For example, in one implementation a video content characteristic of interest may be the face of a person. In such an implementation, a face recognition algorithm is employed at box 30 to generate a reference signature 20 for the face of interest. For example, such a face recognition algorithm can generate a reference signature associated with a face based upon one or more measured characteristics of the face, such as distance between the eyes or ears, nose length, hair, skin, or eye color, distance from chin to eyes, and so forth.

While a face is one example of video content that may be used to generate a reference signature 20, other video content may also be employed. For example, a geographic feature (such as a mountain or beach), a structure (such as a landmark, monument, or building), an object (such as a football or car), a generated video characteristic (such as a date/time stamp), and/or any other displayed characteristic or feature may alternatively or additionally be used to generate a reference signature 20. In such embodiments, a reference signature 20 is generated which is characteristic of the feature, structure, and/or object and which may be automatically searched for and identified within the frames of the video stream. Such reference signatures 20 are generated based upon characteristics of the feature, structure, and/or object that are discernible in the video content, such as the color, shape, texture, and/or proportions. For example, in one embodiment, the object of interest may be a jersey or uniform associated with a sports team. In such an embodiment, the reference signature 20 may be generated based on the colors of a jersey and their relative proportions and/or proximity to one another. Similarly, in another example, a reference signature 20 may be for a ball used in a sport. In this example, the reference signature 20 may be based on the shape of the ball (such as a football) or on a color pattern or scheme associated with the ball (such as a soccer ball).

The reference signature 20 generated in this manner is combined with an associated action 22 to form the action plan 24. For example, in an embodiment in which the reference signature 20 corresponds to a face, an associated action 22 may be to record those frames of a video stream in which the reference signature 20 is present. In this manner, those portions of a video stream in which the face of the person of interest is displayed are recorded. Conversely, the associated action 22 may be to not record those frames of a video stream in which the reference signature 20 is present. In this manner, those portions of a video stream in which the face of the person of interest is displayed are not recorded.

Similarly, if the characteristic of interest from which the reference signature 20 is derived relates to an image quality characteristic, such as brightness, contrast, color, sharpness, contrast, noise, resolution, and so forth, the associated action 22 may be a corresponding image quality enhancement, such as a sharpening or brightening operation. For example, in an embodiment in which the reference signature 20 is based on frame brightness and in which the frame brightness is discernible from the reference signature 20, frames with brightness below a desired threshold are selectively processed to increase their brightness based on the reference signature 20. In another embodiment, frames with brightness above a desired threshold are selectively processed to decrease their brightness based on the reference signature 20. In yet another embodiment, only those frames above and/or below desired brightness thresholds are recorded. In this manner, those portions of a video stream having the desired brightness characteristics are recorded. As will be appreciated, contrast, sharpness, and/or other discernible visual characteristics may be the basis for (and discernible using) the reference signature 20, so that selective processing and/or recording can be performed based on a variety of visual characteristics of the frames of a video stream. The reference signatures 20 thereby generated, along with the associated processing and/or recording instruction, are used to generate an action plan 24 that enables the automatic processing of a video stream, as discussed below. As discussed with regard to FIG. 1, in one embodiment, metadata 26 is also associated with the action plan 24 of FIG. 2, such as to provide textual, numeric and/or audio annotations of a video file produced in accordance with the action plan 24 or of the constituents of such a video file.

Figure 3:
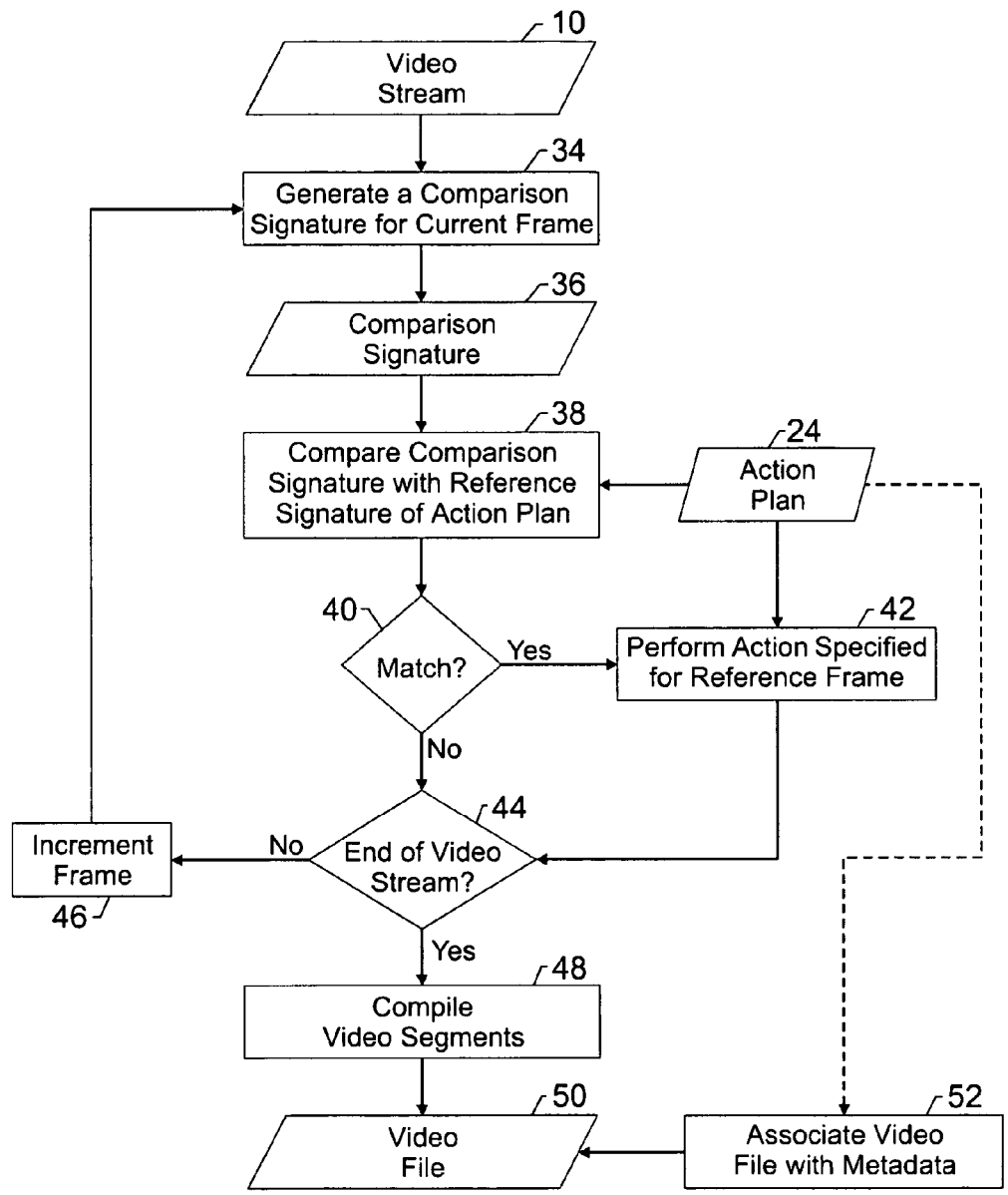
FIG. 3 is a flowchart depicting exemplary generation of a video file, in accordance with aspects of the present invention.

As described in FIGS. 1 and 2, different embodiments of the present invention result in the generation of action plans 24 in which one or more reference signatures 20 and associated actions 22 are related. Referring now to FIG. 3, a flowchart is provided depicting an embodiment of the present invention in which the action plans 24 are used to process a video stream 10. In this embodiment, a comparison signature 36 is generated (block 34), for a current frame of the video stream 10 using a signature-generating algorithm. In this embodiment, the signature-generating algorithm is the same algorithm employed to generate the reference signatures 20 contained within the action plan 24.

In the depicted embodiment, each comparison signature 36 is compared to the reference signatures contained in the action plan 24 (block 38). If the comparison signature 36 matches a reference signature of the action plan 24, as determined at decision block 40, the action corresponding to the matched reference signature is performed (block 42). For example, the corresponding action may be to record the current frame and/or subsequent frames, to cease recording, and/or to enhance or filter the current and/or subsequent frames, as discussed above. At decision block 44, a determination is made whether the current frame was the last frame of the video stream 10. If additional footage remains, processing proceeds to the next frame (block 46), and a new comparison signature 36 is generated. Conversely, if it is determined at decision block 44 that the end of the video file 10 has been reached, recorded and/or enhanced video segments or frames are compiled to generate a video file 50 (block 48). The compiled video file 50 may be in a raw format, consisting simply of recorded video frames, or it may be in a standardized and compressed format, such as an audio/video interleave (AVI) format or a moving pictures experts group (MPEG) video file format. In one embodiment, the format of the video file 50 enables the storage of metadata, such as textual descriptions of individual frames or sequences of frames. In such embodiment, metadata is provided by the operator and/or by the action plan 24, and is associated with the appropriate video segments or with the video file as a whole (block 52).

The preceding aspects of embodiments of the present invention may be implemented in a variety of manners. For example, in one implementation, a computer, configured with a suitable processor, memory, input device, and display, executes software routines implementing some or all of the aforementioned functionality(ies). In another implementation, a video adapter for use in a computer or other electronic device implements some or all of the previously described functionality(ies), such as via dedicated circuitry and/or software routines. In such implementation, the video adapter includes a video processor, video memory, and/or display circuitry. In an additional embodiment, a consumer electronic device, such as a combination VCR and DVD player/writer includes a processor, memory, and display circuitry configured to implement, either by dedicated circuitry and/or software routines, the previously described functionality(ies). As will be appreciated by one of ordinary skill in the art, these embodiments are merely exemplary, and in no way exhaustively describe the array of electronic devices capable of implementing the above-described processes, in part or in their entirety. With this in mind, the following exemplary embodiments generally describe the various components and circuitry that may be employed.

Figure 4:
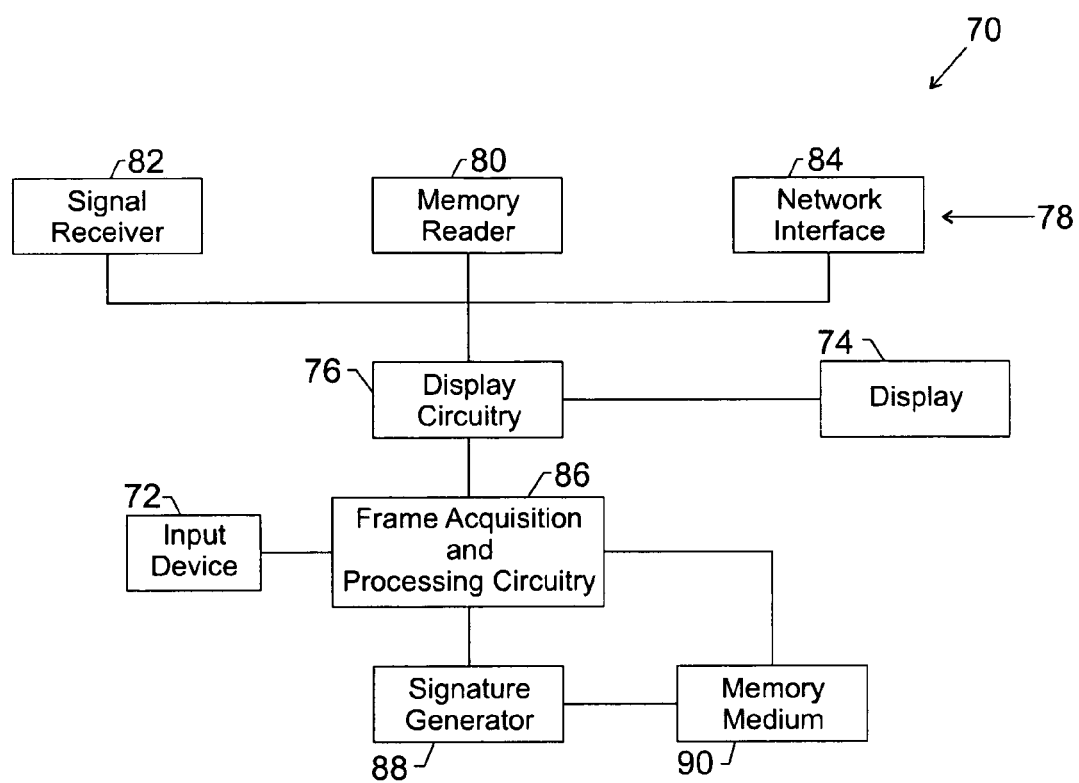
FIG. 4 depicts an exemplary system for generating a video processing action plan, in accordance with aspects of the present invention.

For example, referring now to FIG. 4, a block diagram depicting an exemplary processor-based device, generally designated by the reference numeral 70, is illustrated. The device 70 may be any one of a variety of different types, such as a computer, a control circuit, a circuit board, a VCR/DVD conversion system, a DVR/DVD conversion system, a video archiving system, etc. In the depicted embodiment, the device 70 communicates with an input device 72 by which a user interacts with the device 70. The input device 72 can be a remote control, a mouse, a keyboard, a console user interface including buttons and/or switches, and so forth and may communicate with the device via a wire or wireless medium. The input device 72 enables a user to control the acquisition of frames of a video stream and/or to provide associated actions for selected frames or reference signatures, as described below.

The depicted embodiment also includes a display 74 coupled to display circuitry 76 of the device 70. Examples of a suitable display 74 include a liquid crystal display (LCD), a cathode ray tube (CRT), a plasma display, and so forth. The display 74, via the display circuitry 76, visually depicts a video stream for review by a user. The video stream may be acquired from one or more video input mechanisms 78. One example of such a video input mechanism is a memory reader 80, such as a reader configured to read an optical or magnetic medium or a solid state-based memory device. In one embodiment, the memory reader 80 is an optical media reader configured to read a DVD, a compact disk (CD), a laser disc, or other optical media, such as a holographic memory. In another embodiment, the memory reader 80 is a magnetic media reader, such as an analog or digital video tape player or a fixed or removable hard disk drive. Similarly, in other embodiments, the memory reader 80 is a device configured to access and read a solid state memory device such as a universal serial bus (USB) pen drive, a secure digital (SD) card, or other memory incorporating solid state memory circuitry. An additional example of a video input mechanism 78 is a network interface 84 used to download or receive a video stream (via a wire or wireless connection) from a network, such as the Internet, a local area network (LAN), a storage area network (SAN), etc. Similarly, in another example the video input mechanism 78 is a signal receiver 82, such as a television (TV) tuner, configured to receive a television or other video signal via a cable TV connection, antenna, satellite receiver, or other receiver configured to acquire over the air video transmissions.

Continuing with the embodiment of FIG. 4, the video stream acquired by the video input mechanism 78 is displayed on the display 74 by the display circuitry 76. While the stream is displayed, reference frames may be identified, such as by an operator employing the input device 72. The frame acquisition and processing circuitry 86, when prompted via the input device 72, acquires a currently displayed frame of the video stream. In one implementation, the acquired frame is then processed by a signature generator 88 to generate a reference signature, as discussed above. In one embodiment, the signature generator 88 is a specialized circuit configured to implement a signature-generating algorithm, either by hardware design, software implementation, or a combination of these techniques. In another embodiment, the signature generator 88 is a general processor, such as a central processing unit (CPU) or video processor of a video adapter, implementing a signature-generating algorithm.

The reference signature generated by the signature generator 88 is stored on a memory medium 90. For example, in some embodiments, the reference signature is stored on the memory medium 90 for subsequent review or for incorporation into an action plan. In other embodiments, the reference signature is incorporated into an action plan that is stored on the memory medium 90. In the depicted embodiment, the memory medium 90 is any type of medium that may be written to/read by the frame acquisition and processing circuitry 86 and signature generator 88. For example, in one implementation, the memory medium 90 is a hard drive, such as may be present in a DVR or computer. In another implementation the memory medium 90 is random access memory (RAM), such as may be present in a computer, on a video adapter, or in other processor-based systems and consumer electronic devices. In one embodiment, the memory medium 90 stores frames acquired by the frame acquisition and processing circuitry 86 for subsequent retrieval and processing by the signature generator 88. In this embodiment, therefore, the memory medium 90 stores acquired frames as well as generated reference signatures. As will be appreciated by those of ordinary skill in the art, the memory medium 90 may be local to or remote from other components of the device 70. For example, the memory medium 90 be within a computer or consumer electronic device or may be external to but in communication with (such as over a network) a computer or consumer electronic device housing some or all of the other components.

Figure 5:
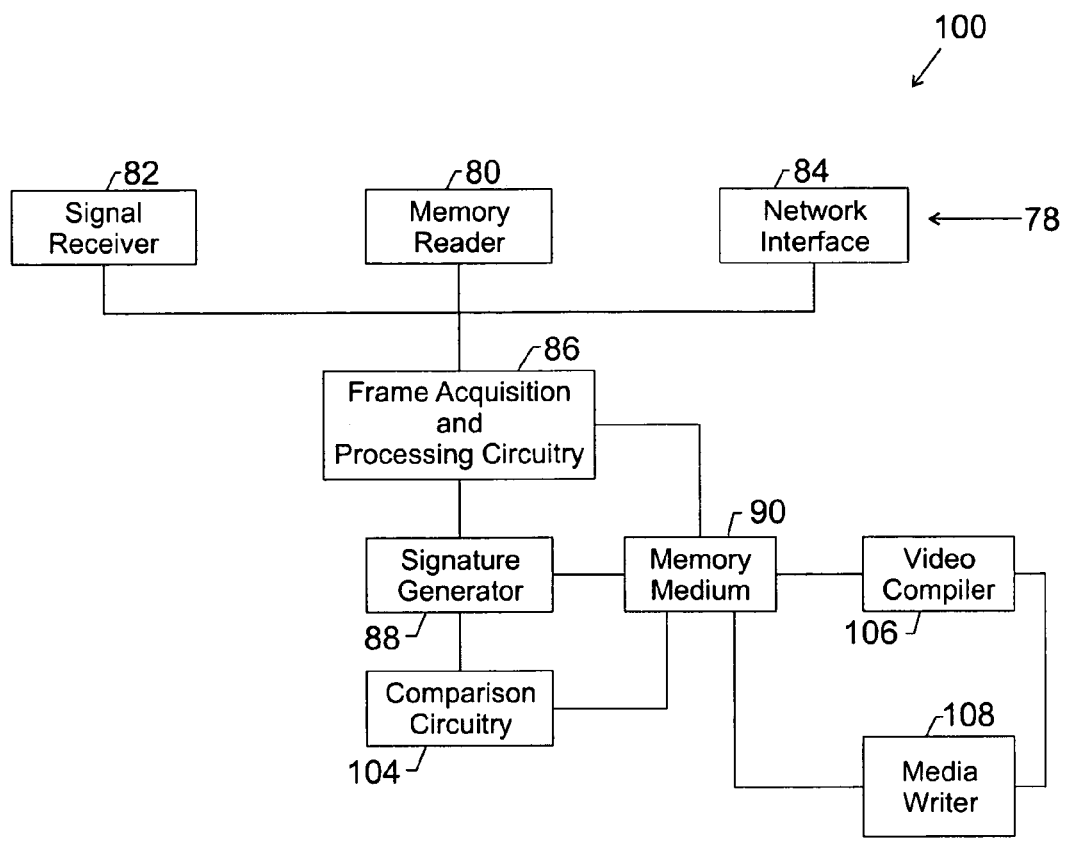
FIG. 5 depicts an exemplary system for generating a video file, in accordance with aspects of the present invention.

The device 70 of FIG. 4 is suitable for generating a reference signature and action plan. For the purpose of illustration, FIG. 5 depicts an exemplary processor-based device 100 capable of processing a video stream based on an action plan and/or reference signatures such as may be generated by device 70 of FIG. 4. Similar components in FIGS. 4 and 5 are depicted using the corresponding reference numbers discussed above with regard to FIG. 4. As will be appreciated by those of ordinary skill in the art, the functionalities provided by the respective processor-based devices 70 and 100 may be implemented in one device, such as a computer or consumer electronic device, or in separate devices.

Referring now to FIG. 5, a video input mechanism 78, such as the memory reader 80, signal receiver 82, or network interface 84 discussed above, provides a video stream to frame acquisition and processing circuitry 86. In one embodiment, a signature generator 88 processes the frames sequentially acquired by the frame acquisition circuitry to generate a comparison signature for each frame. Comparison circuitry 104 compares each comparison signature to the reference signatures of an action plan stored on a memory medium 90. In one embodiment, the comparison circuitry 104 is a specialized circuit configured to compare the signatures, either by hardware design, software implementation, or a combination of these techniques. In another embodiment, the comparison circuitry 104 is a general processor, such as a central processing unit (CPU) or video processor of a video adapter, implementing a comparison routine.

Based upon the comparison, the frame acquisition and processing circuitry 86 may be instructed to begin a recording operation, to terminate a recording operation, to filter or to otherwise process acquired frames, and so forth. Frames acquired or processed in response to these instructions may be written to the memory medium 90. In one embodiment, frames written to the memory medium 90 are compiled, either on-the-fly or after completion of the video stream, by a video compiler 106 to generate a video file. In one embodiment, the video compiler 106 is a specialized circuit configured to compile acquired frames into a desired compressed or uncompressed video format, either by hardware design, software implementation, or a combination of these techniques. In another embodiment, the video compiler 106 is a general processor, such as a central processing unit (CPU) or video processor of a video adapter, implementing a compilation routine.

In one embodiment, a video file generated by the video compiler 106 is stored, temporarily or permanently, on the memory medium 90. In another embodiment, the compiled video file is written to a suitable media by a media writer 108, such as a magnetic media writer, an optical media writer, or a device configured to write to a solid state memory medium (such as a USB pen drive or SD card). For example, a suitable magnetic media writer is a tape drive configured to write to analog or digital video tape, a floppy drive, a hard drive, and so forth. Similarly, a suitable optical media writer is a DVD burner, a CD burner, and so forth. As will be appreciated by one of ordinary skill in the art, the functionality of a respective optical media reader and optical media writer or of a respective magnetic media reader and magnetic media writer may be combined in a single drive or interface, such as a DVD read/write drive, a video tape player/recorder, a hard drive, and so forth.

What is claimed is:

1. A method, comprising:
generating, by a processor, a comparison signature for each of a plurality of frames of a video stream;
comparing, by the processor, each comparison signature to a reference signature; and
recording, by the processor, each of said plurality of frames whose comparison signature substantially matches the reference signature, but not recording frames whose comparison signature does not substantially match the reference signature.

2. The method of claim 1, wherein generating the comparison signature comprises generating a checksum.

3. The method of claim 1, wherein generating the comparison signature comprises generating the comparison signature based on a set of pixel luminance information for the frame.

4. The method of claim 1, wherein generating the comparison signature comprises generating the comparison signature based on a set of pixel color information for the frame.

5. The method of claim 1, further comprising:
adding metadata to the recorded frames.

6. The method of claim 1, further comprising:
generating a video file comprising the recorded frames.

7. The method of claim 1, further comprising:
altering the recorded frames.

8. The method of claim 7, wherein altering the recorded frames comprises adjusting at least one of a brightness, a contrast, a sharpness, a color level, a noise level, or a resolution.

9. A method, comprising:
generating, by a processor, a reference signature from a frame of a video stream;
assigning an action to the reference signature; and
grouping, by the processor, a plurality of frames in the video stream each having a comparison signature that substantially matches the reference signature separate from frames each having a comparison signature that does not substantially match the reference signature.

10. The method of claim 9, wherein generating the reference signature comprises generating a checksum.

11. The method of claim 9, wherein assigning the action comprises assigning a recording instruction and a metadata label instruction.

12. The method of claim 9, wherein assigning the action comprises assigning a frame alteration instruction.

13. The method of claim 9, further comprising:
generating different action plans by assigning different actions to the reference signature.

14. The method of claim 13, further comprising:
selectively generating different video files by processing the video stream using the different action plans.

15. A system, comprising:
frame acquisition circuitry configured to acquire a selected frame of a video stream based on an operator input;
a signature generator configured to generate a first reference signature based on the selected frame;
comparison logic that determines if the first reference signature is a unique reference signature by comparing the reference signature to a comparison signature for each frame of the video stream, wherein if the first reference signature is not a unique reference signature the comparison logic determines a closest frame to the selected frame, said closest frame having a unique reference signature and wherein the signature generator generates a second reference signature based on the unique reference signature of said closest frame; and
when the first reference signature is not unique, a processor that performs a predetermined action upon detection that a comparison signature substantially matches the second reference signature.

16. The system of claim 15, further comprising display circuitry configured to receive the video stream and to display the video stream.

17. The system of claim 15, further comprising a media reader configured to read the video stream and to provide the video stream to a display circuitry.

18. The system of claim 15, further comprising a network interface configured to receive the video stream over a network.

19. The system of claim 15, wherein the second reference signature is based on at least one of the entire closest frame, a portion of the closest frame, or a feature of interest depicted by the closest frame.

20. The system of claim 15, wherein the signature generator executes a signature-generation algorithm to generate the first and second reference signatures.

21. A system for generating a video file, comprising:
frame acquisition circuitry configured to acquire each frame of a video stream;
a signature generator configured to generate a comparison signature for a current frame; and
comparison circuitry configured to compare each comparison signature with a plurality of reference signatures associated with different actions; and
processing logic configured to perform each action, wherein at least one of the actions separates a plurality of frames each having a comparison signature that substantially matches a given reference signature from frames each having a comparison signature that does not substantially match the given reference signature.

22. The system of claim 21, further comprising a media reader configured to acquire the video stream from one of an optical medium or a magnetic medium.

23. The system of claim 21, further comprising a network interface configured to receive the video stream over a network.

24. The system of claim 21, wherein the signature generator executes a signature generation algorithm to generate the reference signature.

25. The system of claim 21, further comprising a video compiler configured to generate a video file comprising frames having a comparison signature that substantially matches a given reference signature.

26. The system of claim 25, wherein the video compiler is configured to store the video file on a memory medium.

27. The system of claim 21, further comprising a media writer configured to write frames having a comparison signature that substantially matches a given reference signature to at least one of an optical medium or a magnetic medium.

* * * * *